Dec. 14, 1926.  
C. KNOWLES  
1,611,047  
GEAR GRINDING MACHINE  
Filed Feb. 7, 1923  3 Sheets-Sheet 1

INVENTOR  
Carroll Knowles  
BY  
ATTORNEY

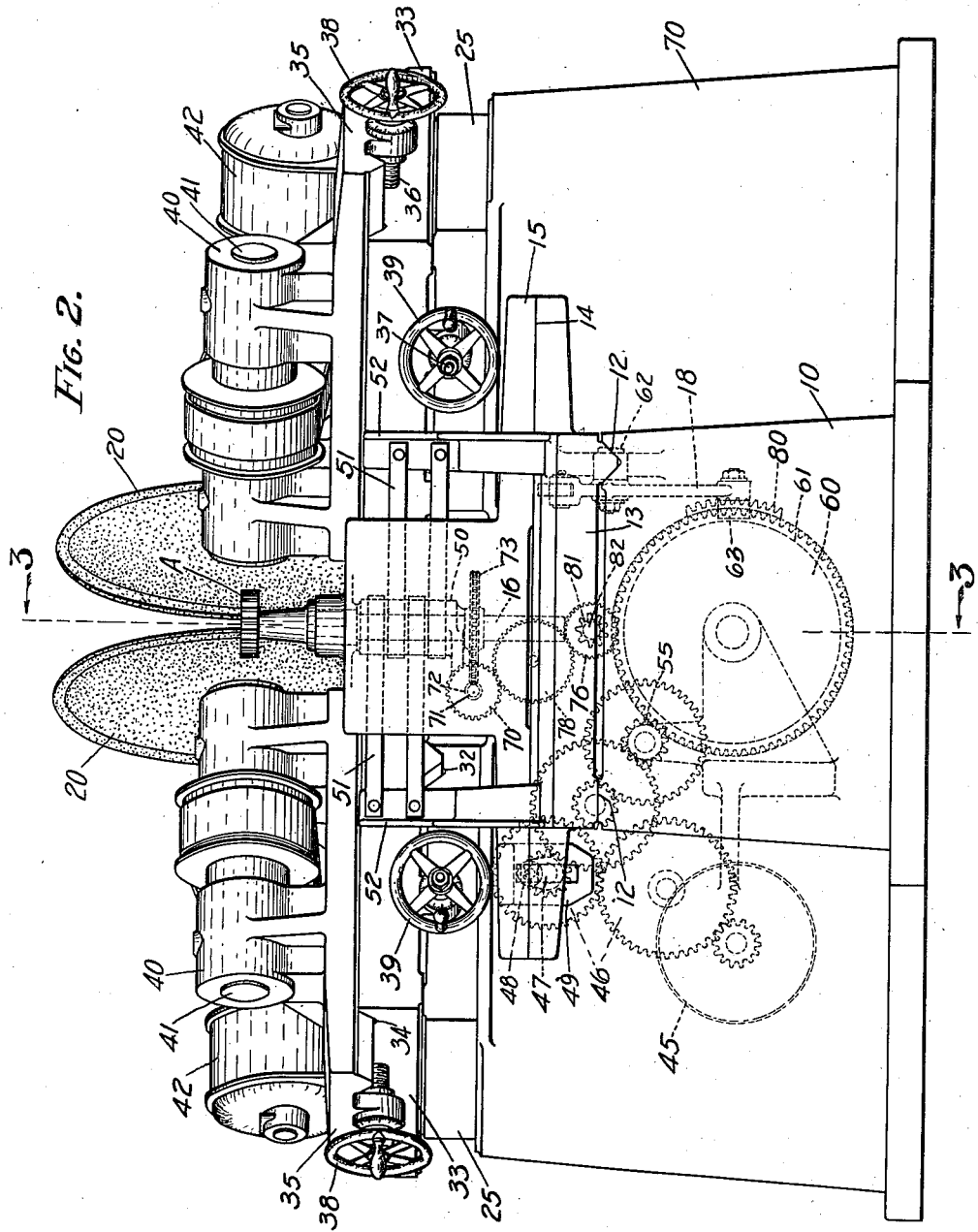

Dec. 14, 1926.
C. KNOWLES
1,611,047
GEAR GRINDING MACHINE
Filed Feb. 7, 1923     3 Sheets-Sheet 3
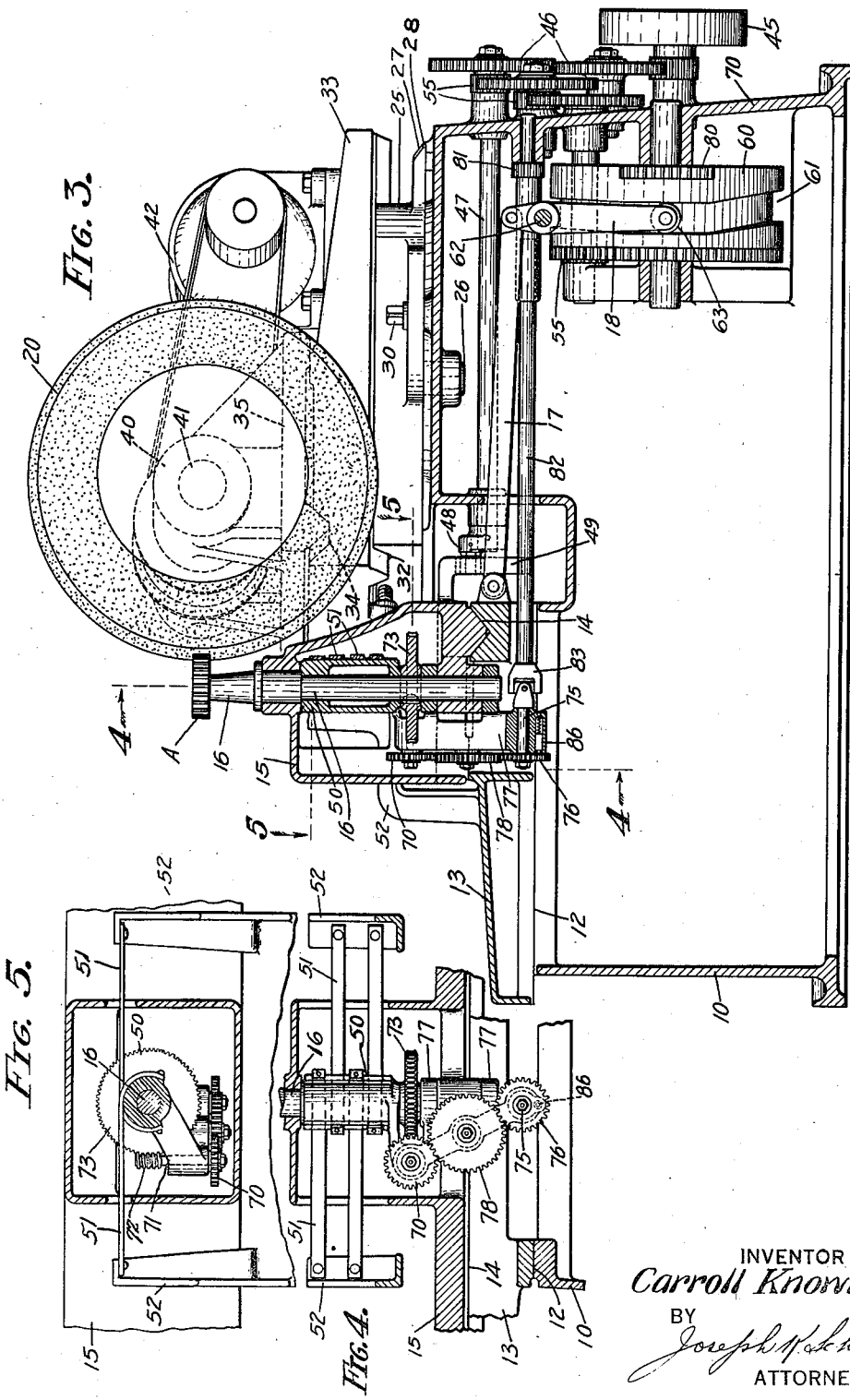
INVENTOR
Carroll Knowles
BY
ATTORNEY Patented Dec. 14, 1926.

1,611,047

UNITED STATES PATENT OFFICE.

CARROLL KNOWLES, OF HARTFORD, CONNECTICUT, ASSIGNOR TO PRATT & WHITNEY COMPANY, OF NEW YORK, N. Y., A CORPORATION OF NEW JERSEY.

GEAR-GRINDING MACHINE.

Application filed February 7, 1923. Serial No. 617,593.

This invention relates to gear grinding machines and in particular to a machine which will rapidly and accurately generate involute curves on the flanks or sides of gear teeth.

An object of the present invention is to provide an improved gear grinding machine which is adapted to rapidly grind narrow faced gears within a wide range of diameters to a high precision.

One feature which enables me to accomplish the above object is that the gear blank is so mounted that it may in effect be rolled past one or more grinding wheels and, between each complete feeding movement of the gear blank, it may be withdrawn directly from engagement with the wheel, or wheels, indexed, and then again advanced to engage the wheel or wheels upon other teeth.

Another object of the invention is to provide means to completely grind opposite sides of adjacent or alternate teeth by advancing the work and wheels directly toward each other. As soon as the work and wheels have reached their position nearest the wheels and the wheels have completed their grinding operation in that tooth space, the work and wheels are separated to completely disengage them and the work is then indexed one or more tooth spaces and the cycle of operation is repeated. Preferably, the cycle of operations of the machine is carried out at high speed and the movements to effect the alternate indexing and grinding operations are preferably accomplished by the continuous rotation of a member.

Another feature which is advantageous is that cam means for controlling the movements of the gear blank supporting spindle toward and from the wheels are provided so that the blank together with the carriage on which it is mounted may be very slowly advanced toward the wheel or wheels while the wheels engage the tooth sides and thereafter may be rapidly withdrawn therefrom.

Another feature which is advantageous is that the indexing mechanism and the feeding movements of the gear blank are controlled by rotation of a cam drum, the indexing mechanism being actuated by an intermittently operated gear which is rotated while in engagement with a plurality of gear teeth mounted on the periphery of the cam drum.

More particularly, it is an object of the invention to provide a machine having two adjustably positioned grinding wheels adapted to engage opposite sides of adjacent or alternate teeth upon plane radial surfaces of the wheels and to provide a plurality of carriages for mounting the gear blank spindle and the blank itself so that it may be given simultaneous rotative and reciprocatory movements to simulate the rolling action of a gear mounted on the spindle along a rack.

With these and other objects in view, my invention consists in the features of construction and operation set forth in the following specification and illustrated in the accompanying drawings.

In the accompanying drawings annexed hereto and forming a part of this specification, I have shown my invention embodied in a spur gear grinding machine but it will be understood that the invention can be otherwise embodied and that the drawings are not to be construed as defining or limiting the scope of the invention, the claims appended to this specification being relied upon for that purpose.

In the drawings:

Fig. 2 is a front elevation of the complete machine.

Fig. 3 is a sectional view of the machine taken on line 3—3 of Fig. 2.

Fig. 4 is a sectional view taken on line 4—4 of Fig. 3, and

Fig. 5 is a sectional view taken on line 5—5 of Fig. 3.

Figure 1:
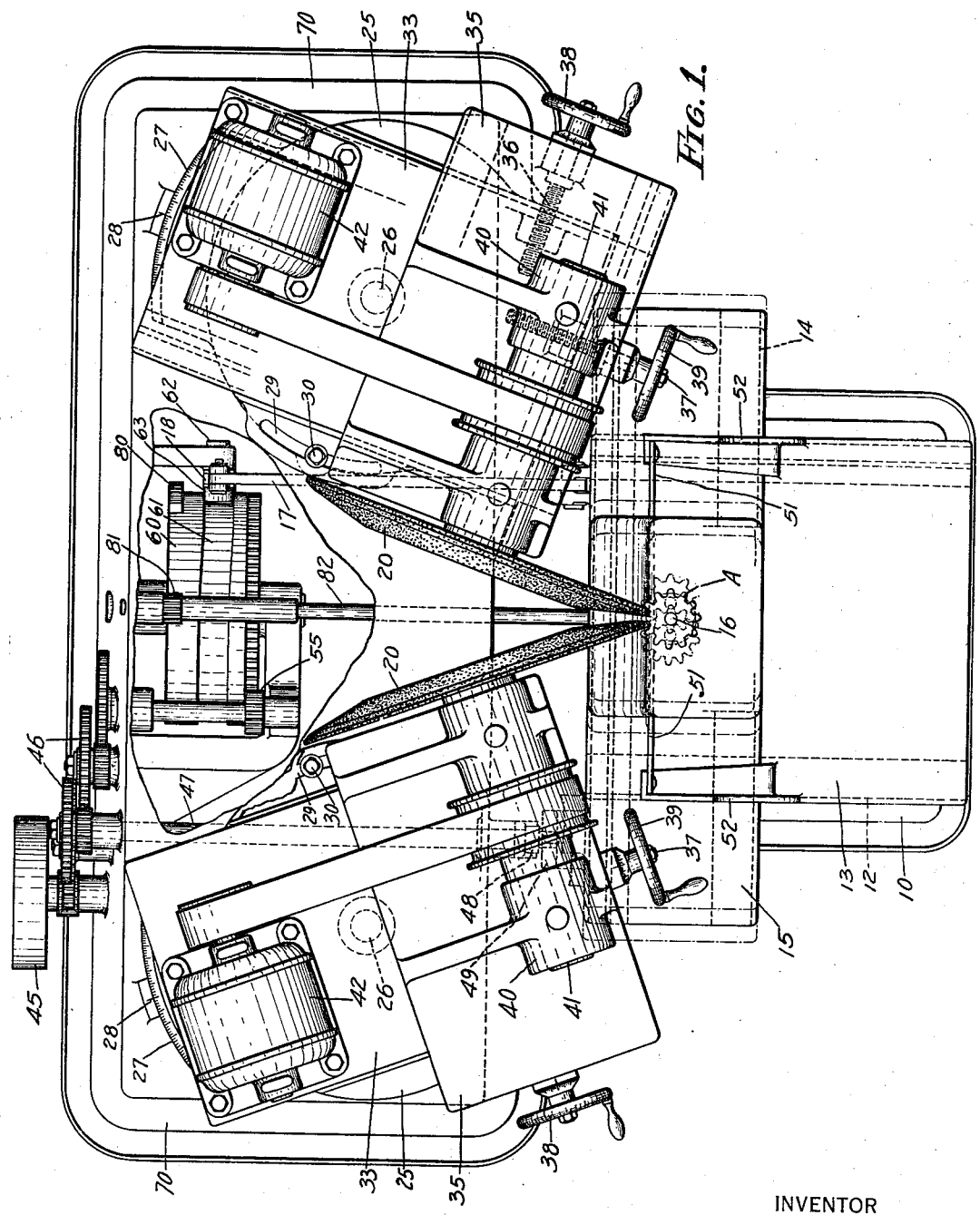
Figure 1 is a plan view of the complete machine.

In the above mentioned drawings, I have shown but one embodiment of the invention which is now considered preferable but it is to be understood that changes and modifications may be made within the scope of the appended claims without departing from the spirit of the invention.

Briefly, my invention in its broadest aspect comprises the following principal parts: first, a base; second, a pair of wheel slides mounted on the upper horizontal surface thereof and preferably arranged so that the positions of the wheels may be adjusted to different angular and radial positions depending upon the size and type of gear being ground; third, a longitudinally reciprocatory work supporting carriage mounted upon a forwardly and rearwardly movable slide; fourth, a cam drum preferably mounted within the base having a cam groove for actuating the slide, and the parts thereon including the work toward the wheels; and fifth, an indexing mechanism adapted to be actuated to index the work blank when it has been moved out of engagement with the wheels.

In the past it has been the practice in grinding involute spur gears to feed the wheels laterally toward or from each other during operation and, while the wheels are so adjusted to roll the gear blank past them. Indexing of the gear blank took place after each complete rolling movement, and, after the gear blank had been rotated or indexed through a complete revolution and each of the teeth had been operated on by the wheels, the wheels were again adjusted either toward or from each other or toward the blank and another series of grinding operations took place. As there were necessarily a large number of indexing movements, each of which required an interval of time, the speed of operation was adversely affected. In the present invention, it is a principal object to restrict the number of indexing movements to a minimum and also to provide mechanism enabling these movements to be effected in the shortest possible instant of time. This is accomplished by completely grinding the tooth flanks engaged by the wheels each time the work is fed directly toward the wheels. There are therefore no more index movements than there are teeth in the particular gear being ground.

Referring more in detail to the figures of the drawings, I provide an elongated base member 10 provided on its horizontal upper surface 11 with ways 12 upon which a slide 13 may be adjusted by any desired means. This slide 13 carries ways 14 on its upper surface disposed at right angles to the ways 12, and, on these latter ways 14 is a carriage 15 carrying the rotatably mounted work spindle 16. The means for effecting the movement of the slide 13 toward and from the wheels comprises a connecting rod 17 attached at its forward end to this slide 13. The rear end of this rod 17 is attached to a pivoted lever. The particular means for actuating this lever 18 in proper timed relation to the other mechanisms of the machine to effect the feeding movements of the gear blank will presently be described.

In rear of the machine are the adjustable mounting means for the abrading wheels 20, two of which are preferably provided. As the mounting for each of the wheels is similar to the other, except for being oppositely disposed, a description of one will suffice for both. Angularly adjustable on the base 10 are the blocks 25 each having a central depending stud 26 entering an orifice within the base. This permits the member or block 25 to be angularly adjusted to any desired position. For convenience graduations 27 are provided on this member which in connection with a zero line 28 provided on the base 10 enables the block 25 and the wheel 20 thereon to be adjusted to any predetermined angle. Also, arcuate slots 29 in this block 25 through which extends a clamping bolt 30 provides clamping means for the block in any adjusted position.

On the upper surface of the angularly adjustable member or block 25 are ways 32 on which is movably mounted a slide 33. On the forward portion of this slide 33 are ways 34 at right angles to the ways 32 on which it moves. Mounted to move on these ways 34 is a slide or head 35. Screws 36 and 37 rotated by hand wheels 38 and 39 provide adjusting means for the slides 33 and 35 relative to each other and the block 25. Mounted on the upper slide 35 are suitable bearings 40 for the wheel spindle 41. As shown the axis of this spindle 41 extends longitudinally of the upper slide 35. The adjusting screws 36 and 37 therefore provide means to adjust the wheel 20 either axially or transversely.

Preferably motors 42 are mounted on these latter slides 35 whereby the wheels 20 may be rotated at a high speed by means of suitable belts passing over a pulley 43 on the spindle 41. The motors 42 therefore will not require adjustment with each adjusting movement of the slides 33 and 35. The above described means enable the two grinding wheels 20 to be adjusted accurately to any desired predetermined position as may be necessary for different types of gears being ground. It will, of course, be understood that but one wheel 20 may be used if desired but I preferably provide two symmetrically disposed wheels as shown so that opposite sides of adjacent or alternate teeth may be simultaneously ground. During operation upon gears, after the necessary preliminary adjustments have been made, the wheels 20 are fixed securely in adjusted position and this adjustment is not required to be changed until gears of a different size or type are to be operated on. The wheels 20 as shown are provided with flat radial or side surfaces adapted to contact with the work during the grinding operation.

The different principal parts and their relation to each other have now been described. The mechanism whereby these parts are actuated in timed relation to each other will now be described. For this purpose the main drive of the machine comprises a main pulley 45 connected through suitable gearing 46 to a forwardly extending shaft 47. At the forward end of this shaft 47 is a crank or eccentric 48, the eccentric surface of which engages a vertical elongated slot in an extension 49 to the reciprocating work supporting carriage 15.

By these means including the rotating shaft 47 and eccentric 48, this slide or carriage 15 may be rapidly reciprocated toward the left and right to roll a gear blank A on the spindle 16 past the wheels 20. This spindle 16 is provided with a drum 50 detachably attached thereto, preferably space being provided surrounding the spindle 16 so that drums of different diameters may be readily substituted. Around the drum 50 on this arbor or spindle 16 extend bands 51 in opposite directions preferably two being provided extending in both directions. The ends of these bands 51 are attached to integral extensions 52 on the forwardly and rearwardly movable slide 13.

It will be seen from the above described mechanism that reciprocation of the work mounting slide or carriage 15 to the left and right of the machine will reciprocate the work holding arbor 16, and will cause it to be rotated due to the wrapping and unwrapping of the bands 51 about the drum 50. As these two movements of the spindle 16 take place simultaneously the resultant action simulates the rolling action of a vertically positioned cylinder back and forth upon a vertical plane. The cylinder being rolled is of the same size as the drum 50 fast to and rotating with the work spindle 16 and corresponds exactly with the pitch cylinder of the particular gear blank being ground. On the upper end of the work spindle 16, the work blank A may be removably attached. The diameter of the drum 50 mounted on the work spindle 16 is required to be chosen with particular preference to the pitch diameter of the gear being ground and of a high precision to correctly actuate the gear blank.

Preferably the shaft 47 and eccentric 48 are constantly rotated and the work spindle and its blank A are continuously being actuated so that in effect the blank is continuously rolled back and forth past the wheels 20. With the wheels 20 properly adjusted for the particular gear A being ground, the gear is rolled into and out of contact with the wheels with each reciprocation. This grinding action continues while the gear A is being advanced toward the wheels 20 by rearward movement of the supporting slide 13. It will be seen therefore that opposite surfaces of alternate or adjacent teeth may be entirely finished with one movement of the blank A toward the wheels 20.

During the movement of the work spindle 16 and its attached parts away from the wheels 20, an indexing movement is given to the spindle 16 to present other gear teeth in grinding position relative to the wheels. Preferably, and in the embodiment of the invention shown, this index movement takes place each time the work spindle 16 is retracted from the wheels 20. The means whereby these alternate movements, that is, the feeding movement of the blank towards the wheels and its indexing movements are obtained, will now be described.

Preferably mounted within the base 10 and suitably driven from the main driving pulley 45, through suitable gearing 55, is a slowly rotating cam drum 60, the periphery of which is provided with a groove 61 of irregular form. Mounted adjacent this drum 60 is the lever 18 previously referred to mounted so that it may oscillate about the short shaft 62 as shown. The lower arm of this lever 18 is provided with a roller 63 adapted to contact with the cam groove 61 on the cam drum 60, and the upper arm has pivoted thereto the reach arm 17 previously described. The opposite end of this reach arm 17 is made fast to and actuates the work carriage 13. It will be seen from this construction that rotation of the cam drum 60 will oscillate the lever 18 by reason of the form of the cam groove 61 and thus force the work carriage 13 directly toward or directly from the grinding wheels. The form of the groove 61 is such that the movement of the carriage and gear blank and slide 13 toward the wheels is very slow and the movement by which the gear blank A is returned to its initial position is made relatively rapid. It is during the advancing movement of the work blank A toward the wheels 20 that the cutting or grinding operation takes place.

It is of course necessary in grinding gears that each time the gear blank is advanced toward the abrasive wheels that new gear teeth be presented to be ground, and I accomplish this by means actuated from the cam drum 60. Mounted on the work reciprocating carriage 15 so that it may oscillate with the work arbor or spindle 16, is a train of gears, the upper one 70 of which is mounted on a shaft 71 having a worm 72 in mesh with a worm wheel 73 directly fastened to the spindle 16.

The support carrying the shaft 71 and also the shaft 75 for gear 76 comprises an extension 77 formed integrally with the drum member 50 and therefore oscillates with this drum. Between the gears 70 and 76 is an idler gear 78 rotatably mounted on the extension 77. To actuate this train of gears the following mechanism is provided.

On the cam drum 60 is a segmental gear 80 adapted with each revolution of the drum 60 to rotate a gear 81 on a forwardly extending shaft 82. The forward end of shaft 82 is provided with a universal joint 83. As the forward end of the shaft 82 partakes of the reciprocatory movements of the slide 13 while the drum 50 is oscillating, the shaft 82 is made in telescoping sections. It will be seen from an inspection of Fig. 3 that the universal joint 83 has its center of oscillation directly in alignment with the axis of the work spindle 16. In this way the shaft 75, which is attached to the opposite side of the universal joint 83, may oscillate freely with movements of the drum 50 and its extension 77. Also the gear 76 and therefore the worm wheel 73 may be rotated to index the blank A during oscillation of the drum 50.

The mechanism above described provides means for periodically indexing the work spindle 16, which movements by reason of the fact that they are actuated from the drum 60 will be in timed relation to the feeding movements. The gearing including gears 70, 76 and 81 for this indexing mechanism is such that different ratios may be readily substituted and the worm wheel 73 rotated an angular distance represented by one or a plurality of teeth on the gear blanks. Also by substituting different gears for those shown at 70 and 76 the indexing may be varied for different numbers of teeth.

To retain the indexing mechanism in proper operation during the grinding operation, I provide a resiliently supported detent 86. This may be mounted in the extension 77 and engage a slight depression in the face of gear 76. With each operation of the indexing mechanism by rotation of the shaft 83 the shaft 83 and gear 76 complete exactly one revolution or a multiple number of revolutions so that the detent 86 will always engage its depression and the gear 76 will always be retained in exactly the same position.

The operation of the machine will be clear from the description of its mechanism given above. It will be obvious also that the machine will be capable of high production as the grinding operation is continuous with the exception of the brief intervals of time to effect the index movements. In addition to the above and although the machine is designed particularly for large numbers of identical gears, the adjustments necessary for different sizes and pitches of gears may be quickly and easily made.

What I claim is:

1. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, and automatic means to move said work spindle and wheel radially one toward and from the other to feed the work during rolling movements of the gear blank.

2. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, and cam actuated means to reciprocate said work spindle toward and from the wheel to feed the work during rolling movements of the gear blank.

3. A gear grinding machine comprising in combination, a base, a rotatable grinding wheel thereon, means to adjust the position of the grinding surface of the wheel, a work supporting spindle, means to simulate a rolling movement of a gear blank on said spindle, automatic means to radially move said blank and wheel one toward and from the other, means to index said work spindle, and means to operate the indexing means in timed relation to the relative movements of the spindle and wheel.

4. A gear grinding machine comprising in combination, a base, a rotatable grinding wheel thereon, means to adjust the position of the grinding surface of the wheel, a work supporting spindle, means to simulate a rolling movement of a gear blank on said spindle, automatic means to relatively move said blank and wheel one toward and from the other, means to index said work spindle, and means to operate the indexing means while the work spindle and wheel are separated.

5. A gear grinding machine comprising in combination, a base, a rotatable grinding wheel thereon, means to adjust the position of the grinding surface of the wheel, a work supporting spindle, means to simulate a rolling movement of a blank on said spindle, automatic means to relatively move said blank and wheel one toward and from the other, means to index the blank, a cam drum, and means thereon for controlling the relative movements of the work spindle and wheel and the indexing movements of the spindle.

6. A gear grinding machine comprising in combination, a base, a rotatable grinding wheel thereon, means to adjust the position of the grinding surface of the wheel, a work supporting spindle, means to simulate a rolling movement of a blank on said spindle, automatic means to relatively move said blank and wheel one toward and from the other, means to index the blank, a cam drum, and means thereon for controlling the movements of one of said elements in timed relation to the indexing movements of the blank.

7. A gear grinding machine comprising in combination, a base, a rotatable grinding wheel thereon, means to adjust the position of the grinding surface of the wheel, a work supporting spindle, means to simulate a rolling movement of a blank on said spindle, means to reciprocate the work spindle toward and from the wheel, means to index the blank, a cam drum, and means thereon to actuate the reciprocatory movements of the work spindle and the indexing movements of the blank in timed relation to each other.

8. A gear grinding machine comprising in combination, a base, a rotatable grinding wheel thereon, means to adjust the position of the grinding surface of the wheel, a work supporting spindle, means to simulate a rolling movement of a blank on said spindle, means to reciprocate the work spindle toward and from the wheel, means to index the blank, a cam drum, and means thereon to actuate the reciprocatory movements of the work spindle during the rolling movements of the blank and to effect indexing movements of the blank while the blank is retracted from the wheel.

9. A gear grinding machine comprising in combination, a base, oppositely disposed adjustably mounted grinding wheels, means to rotate the wheels, a work supporting spindle rotatably mounted in a reciprocatory slide, means to simultaneously reciprocate said slide and rotate the spindle whereby a work blank on said work spindle is rolled past said wheel, power means to reciprocate the work spindle toward and from the wheel and means to index said spindle between each advancing movement of the blank toward the wheel.

10. A gear grinding machine comprising in combination, a base, a pair of adjustably mounted grinding wheels thereon, means to rotate the wheels, a slide mounted on the base to move toward and from the wheels, a carriage mounted thereon and movable transversely thereof, a work spindle rotatably mounted in said carriage, means to reciprocate said carriage and rotate the work spindle whereby rolling movements of a gear blank on said spindle are effected, means to actuate the slide toward and from the wheels, and means to index the work spindle each time the slide is moved away from the wheels.

11. A gear grinding machine comprising in combination, a base, a pair of adjustably mounted grinding wheels thereon, means to rotate the wheels, a slide mounted on the base to move toward and from the wheels, a carriage mounted thereon and movable transversely thereof, a work spindle rotatably mounted in said carriage, means to reciprocate said carriage and rotate the work spindle whereby rolling movements of a gear blank on said spindle are effected, means to actuate the slide toward and from the wheels, and means to index the work spindle each time the slide is moved away from the wheels, each of said means being actuated in timed relation to each other.

12. A gear grinding machine comprising in combination, a base, a pair of adjustably mounted grinding wheels thereon, means to rotate the wheels, a slide mounted on the base to move toward and from the wheels, a carriage mounted thereon and movable transversely thereof, a work spindle rotatably mounted in said carriage, means to reciprocate said carriage and rotate the work spindle whereby rolling movements of a gear blank on said spindle are effected, cam operated means to actuate the slide toward and from the wheels, and means operating in timed relation therewith to index the gear blank.

13. A gear grinding machine comprising in combination, a base, a pair of adjustably mounted grinding wheels thereon, means to rotate the wheels, a slide mounted on the base to move toward and from the wheels, a carriage mounted thereon and movable transversely thereof, a work spindle rotatably mounted in said carriage, means to reciprocate said carriage and rotate the work spindle whereby rolling movements of a gear blank on said spindle are effected, cam operated means to actute the slide toward and from the wheels, and means to actuate the indexing means while the work spindle is retracted from the wheels.

14. A gear grinding machine comprising in combination, a base, a pair of oppositely disposed grinding wheels thereon, means to adjust the positions of the grinding surfaces of the wheels, a work supporting spindle, means to reciprocate and rotate the spindle to simulate a rolling movement of a gear blank mounted on said spindle, means to move said spindle toward and away from said wheels, and means to index said spindle and gear blank between each successive advancing movement of the spindle toward the wheels.

15. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, automatic means to relatively move said spindle and wheel one toward and from the other while said gear blank is being constantly rolled, and means to index said spindle and gear blank between each relative advancing movement.

16. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, means to advance said spindle directly toward said wheel while said blank is being rolled to completely grind one side of a gear tooth, and means to index said spindle and gear blank between each advancing movement of the spindle.

17. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, means to advance said spindle directly toward said wheel while said blank is being rolled to completely grind one side of a gear tooth, and automatically operated means to index said spindle and gear blank between each advancing movement of the spindle.

18. A gear grinding machine comprising in combination, a base, a rotatable grinding wheel thereon, means to adjust the position of the grinding surface of the wheel, a work supporting spindle, means to reciprocate and rotate the spindle to simulate a rolling action of a gear blank mounted on said spindle, means to advance said spindle directly toward said wheel while said blank is being rolled to completely grind one side of a gear tooth, and automatically operated means to index said spindle and gear blank through any predetermined angular distance between each advancing movement of the spindle.

In testimony whereof, I hereto affix my signature.

CARROLL KNOWLES.